United States Patent Office.

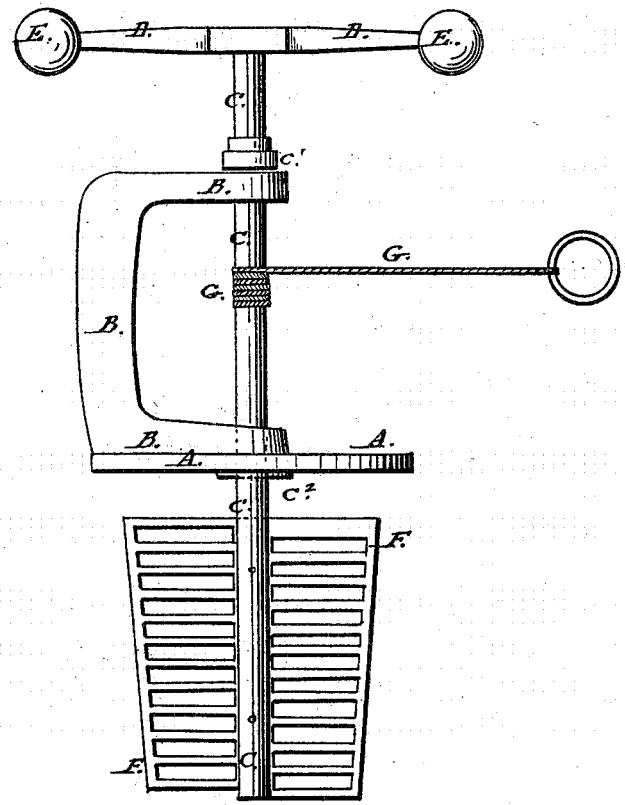

H. G. FOUGEN AND A. C. FOUGEN, OF CAPE GIRARDEAU, MISSOURI.

Letters Patent No. 97,379, dated November 30, 1869.

IMPROVED EGG-BEATER.

The Schedule referred to in these Letters Patent and making part of the same.

To all whom it may concern:

Be it known that we, H. G. FOUGEN and A. C. FOUGEN, of Cape Girardeau, in the county of Cape Girardeau, and State of Missouri, have invented a new and improved Egg-Beater, &c.; and we do hereby declare that the following is a full, clear, and exact description thereof, which will enable others skilled in the art to make and use the same, reference being had to the accompanying drawings, forming part of this specification, in which—

The figure is a side view of our improved machine.

Our invention has for its object to furnish an improved machine for beating eggs, churning, mixing liquids, and other similar uses, which shall be simple in construction, and effective in operation; and It consists in the construction and combination of the various parts of the machine, as hereinafter more fully described.

A is the cover or platform, which is formed to fit upon the vessel in which the eggs are to be beaten, liquids to be mixed, or churning to be done.

B is a handle, the lower arm of which is securely attached to the cover A, in such a position that its end may be directly above the centre of the said platform A.

If desired, the platform A and handle B may be cast solid in one piece.

C is a rod or shaft, that passes down vertically through holes in the ends of the arms of the handle B, and in the centre of the cover or platform A, as shown in the figure.

The shaft C is kept from dropping down too far by a collar, $c^1$, formed upon or attached to the shaft C, and which rests upon the upper side of the upper arm of the handle B, as shown in the figure.

The shaft C is kept from moving up by the pin $c^2$, passed through it beneath the cover or platform A, as shown.

To the upper end of the shaft C, are attached cross-arms, D, having weights, E, attached to their outer ends, to serve as a balance-wheel to give momentum to the machine.

To the lower end of the shaft C, is attached the mixer or dasher F, which we prefer to make in the form shown in the figure; that is to say, in the form of a plate, slotted horizontally upon each side of the shaft C, said slots being so arranged that each slot upon each side of the shaft C may be opposite the portion of the plate between the slots upon the other side of said shaft, so as to produce a more thorough mixing or beating of the substance when the shaft C is revolved.

G is a cord, one end of which is attached to the shaft C, and which is wound around said shaft, as shown in the figure.

The other or free end of the cord G may have a ring or other handle attached to it, for convenience in operating it.

The cord G should be of such a length that it may be wholly unwound by one movement of the arm of the operator. With this construction, by drawing quickly and strongly upon the cord G, the shaft C will be revolved, and will receive sufficient momentum from the weighted arms D E to wind up the cord in the other direction.

As the motion of the revolving parts begins to slacken, the cord G is again drawn out quickly and strongly, revolving the shaft C and its attachments in the opposite direction, thus producing a reciprocating revolving movement, beating the eggs, mixing the liquids, or bringing the butter in a very short time.

Having thus described our invention,

What we claim as new, and desire to secure by Letters Patent, is—

The combination of the platform A, handle B, shaft C, weighted cross-arms D E, cord G, and mixer F, with each other, substantially as herein shown and described, and for the purpose set forth.

The above specification of our invention signed by us, this 5th day of May, 1869.

H. G. FOUGEN.
A. C. FOUGEN.

Witnesses:
JOHN H. FELTMAN,
JOHN JONES.